United States Patent
Park et al.

(10) Patent No.: US 10,085,180 B2
(45) Date of Patent: Sep. 25, 2018

(54) ELECTRONIC DEVICE AND METHOD FOR CONVERTING CALL TYPE THEROF

(71) Applicant: Samsung Electronics Co., Ltd., Suwon-si, Gyeonggi-do (KR)

(72) Inventors: Jinwoo Park, Suwon-si (KR); Jaemo Yang, Suwon-si (KR); Gangyoul Kim, Suwon-si (KR); Beakkwon Son, Yongin-si (KR); Chulmin Choi, Seoul (KR); Hochul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/408,895

(22) Filed: Jan. 18, 2017

(65) Prior Publication Data
US 2017/0238214 A1    Aug. 17, 2017

(30) Foreign Application Priority Data
Feb. 16, 2016   (KR) ......................... 10-2016-0017832

(51) Int. Cl.
*G10L 19/008*    (2013.01)
*H04W 36/00*    (2009.01)

(52) U.S. Cl.
CPC ....... *H04W 36/0016* (2013.01); *G10L 19/008* (2013.01)

(58) Field of Classification Search
CPC .......... H04W 36/00; H04M 1/03; H04B 1/40; G10L 19/08
See application file for complete search history.

(56) References Cited

U.S. PATENT DOCUMENTS

| | | | |
|---|---|---|---|
| 7,751,571 B2 | 7/2010 | Jeong | |
| 2006/0079271 A1* | 4/2006 | Lee | ......................... H04M 1/03 455/550.1 |
| 2006/0182289 A1 | 8/2006 | Chu | |
| 2014/0112482 A1* | 4/2014 | Virette | ................... G10L 19/008 381/23 |
| 2015/0067726 A1 | 3/2015 | Glasser | |

FOREIGN PATENT DOCUMENTS

| | | | |
|---|---|---|---|
| KR | 10-2000-0045184 A | 7/2000 | |
| KR | 10-0592226 | * 1/2004 | ............... H04B 1/40 |
| KR | 10-2005-0063613 A | 6/2005 | |
| KR | 10-0592226 B1 | 6/2006 | |
| KR | 10-0788515 B1 | 12/2007 | |

* cited by examiner

*Primary Examiner* — Myron K Wyche
(74) *Attorney, Agent, or Firm* — Jefferson IP Law, LLP

(57) ABSTRACT

An electronic device and a method for converting a call type of the electronic device are provided. Accordingly, it is possible to provide optimal sound quality and impression of space to a user while providing an optimal stereo call service by upmixing a mono signal to a stereo signal even if stereo call is converted into mono call due to the environment change like a handover while the electronic device performs stereo call with an external electronic device.

20 Claims, 15 Drawing Sheets

ELECTRONIC DEVICE AND METHOD FOR CONVERTING CALL TYPE THEROF

CROSS-REFERENCE TO RELATED APPLICATION(S)

This application claims the benefit under 35 U.S.C. § 119(a) of a Korean patent application filed on Feb. 16, 2016 in the Korean Intellectual Property Office and assigned Serial No. 10-2016-0017832, the entire disclosure of which is hereby incorporated by reference.

TECHNICAL FIELD

The present disclosure relates to an electronic device and a method for converting a call type thereof capable of providing a stereo call service even if a user of the electronic device is present in any network environment.

BACKGROUND

Generally, a voice signal processing technology for improving sound quality at the time of a telephone call between portable electronic devices has been applied.

For example, a voice compression technology has been applied to maximize transmission efficiency and transmit voice information for first generation to fourth generation voice communications made between the existing portable electronic devices.

The voice communications presently support only a mono call type and a signal bandwidth is limited to up to 16 kHz.

The existing narrow band (NB) network, wide band (WB) network, and super wide band (SWB) network support only the mono call type but may not achieve stereo call.

The supported voice channel environment may be changed while a communication network (CN) (network) is changed according to the movement of the electronic device that is busy.

For example, a case in which the environment in which the voice channel is supported by stereo is changed to the environment in which the voice channel is supported by mono may occur.

If conditions like a handover are generated and thus the stereo call is changed to the mono call, the user of the electronic device may not listen to a sound well or may feel deterioration in sound quality.

That is, the mono call may give discomfort to the user experiencing the stereo call through the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for converting a call type thereof capable of supporting an optimal stereo call service by upmixing a mono signal to a stereo signal even if stereo call is converted into mono call due to a change in network environment like a handover.

In accordance with an aspect of the present disclosure, an electronic device is provided. The electronic device includes a communication circuit configured to communicate an audio signal transmitted from an external electronic device with a network supporting a first type, and a second type, and a processor configured to receive the audio signal through the network in a stereo type using the communication circuit, confirm condition information associated with the network, generate other audio signals corresponding to the first type using an audio signal converted from the first type into the second type from the network when the condition information belongs to a set condition, and output the other audio signals through an audio output unit functionally connected to the electronic device.

In accordance with another aspect of the present disclosure, a method for converting a call type of an electronic device is provided. The method includes receiving a stereo signal from an external electronic device through a wireless communication unit, extracting parameters from the stereo signal received by a processor of the electronic device, converting the received stereo signal into a mono signal if a handover is generated while the electronic device communicates with the external electronic device through the stereo signal, and upmixing, by the processor of the electronic device, the extracted parameters to convert the converted mono signal into the stereo signal and output the stereo signal.

In accordance with another aspect of the present disclosure, a non-volatile recording medium having stored thereon a program for controlling a method of an electronic device is provided. The method includes, when the electronic device uses a communication circuit to receive an audio signal through a network by a stereo type, confirming condition information associated with the network, generating other audio signals corresponding to the stereo type using an audio signal converted from the stereo type into a mono type from the network when the condition information belongs to a set condition, and outputting the other audio signals through an audio output unit functionally connected to the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
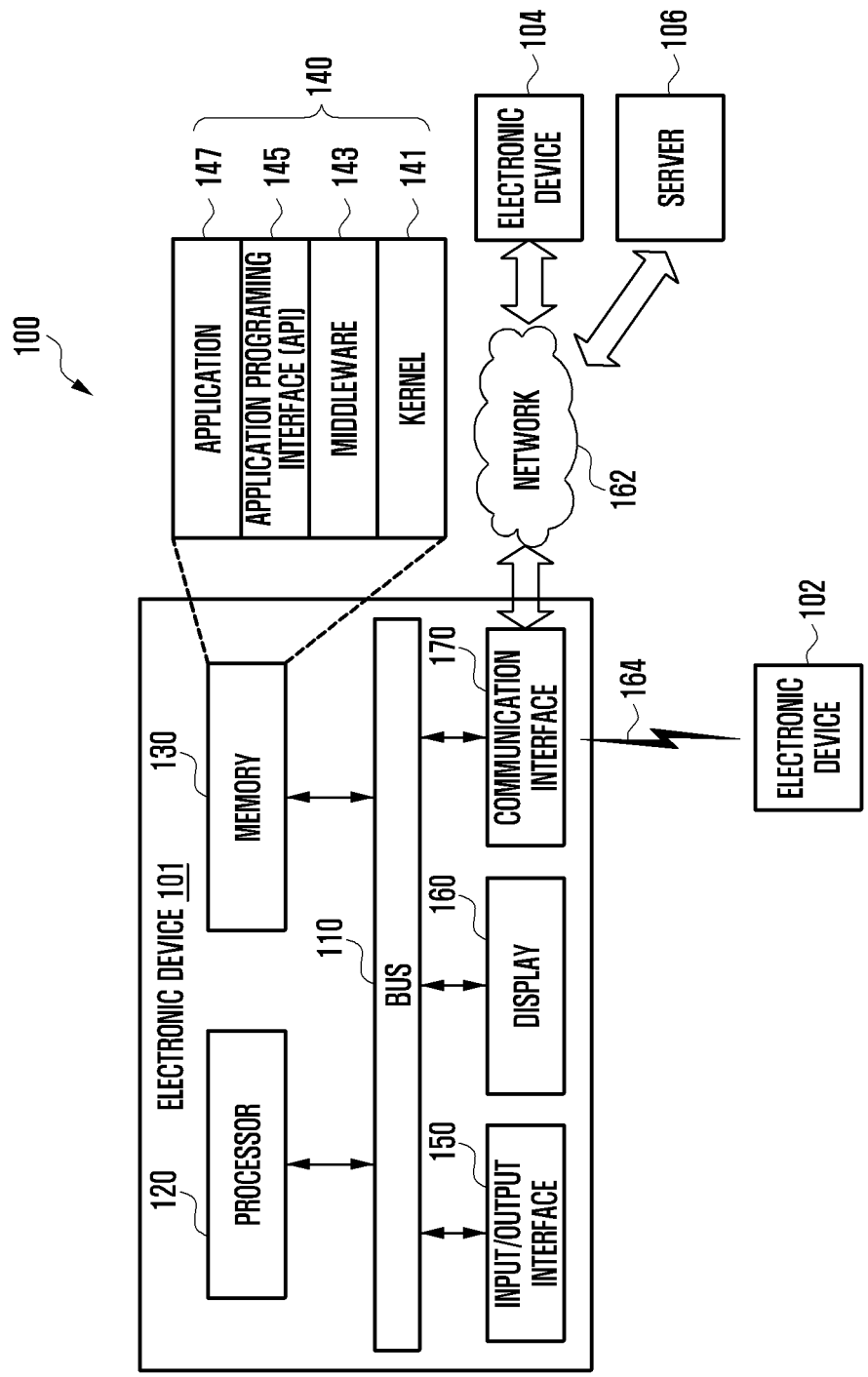
FIG. 1 is a block diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

The terms used in describing various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment including an electronic device according to an embodiment of the present disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an application processor (AP), and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program 140 may include a kernel 141, middleware 143, an application programming interface (API) 145, application programs (or applications) 147, etc. The kernel 141, the middleware 143 or at least part of the API 145 may be called an operating system (OS).

The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED)

display, micro-Electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device For example, the communication interface 170 is capable of communicating with an external device connected to a network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou NSS (Beidou), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following: a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
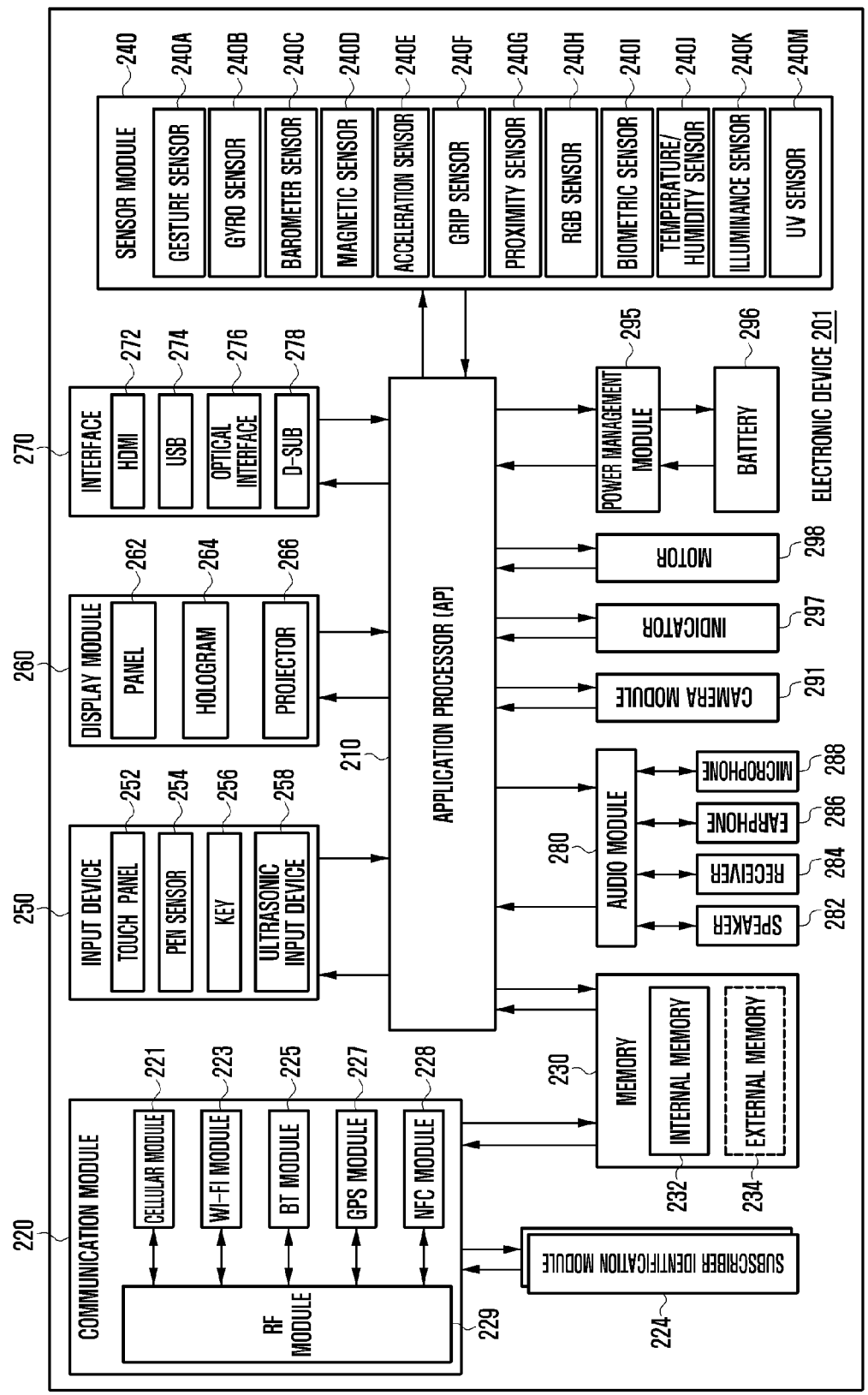
FIG. 2 is a block diagram of an electronic device according to an embodiment of the present disclosure.

FIG. 2 is a block diagram showing a configuration of an electronic device according to an embodiment of the present disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including the cellular module 221, a Wi-Fi module 223, a Bluetooth (BT) module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

Each of the Wi-Fi module 223, the BT module 225, the GNSS module 227, and the NFC module 228 may include a processor for processing data transmitted or received through the corresponding module. At least part of the cellular module 221, Wi-Fi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GNSS module 227, and the NFC module 228 is capable of transmission/reception of RF signals through a separate RF module.

The memory 230 may include a built-in memory 232 or an external memory 234. The built-in memory 232 is capable of including at least one of a volatile memory, e.g., a dynamic random access memory (DRAM), a static RAM (SRAM), a synchronous dynamic RAM (SDRAM), etc. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an infrared touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
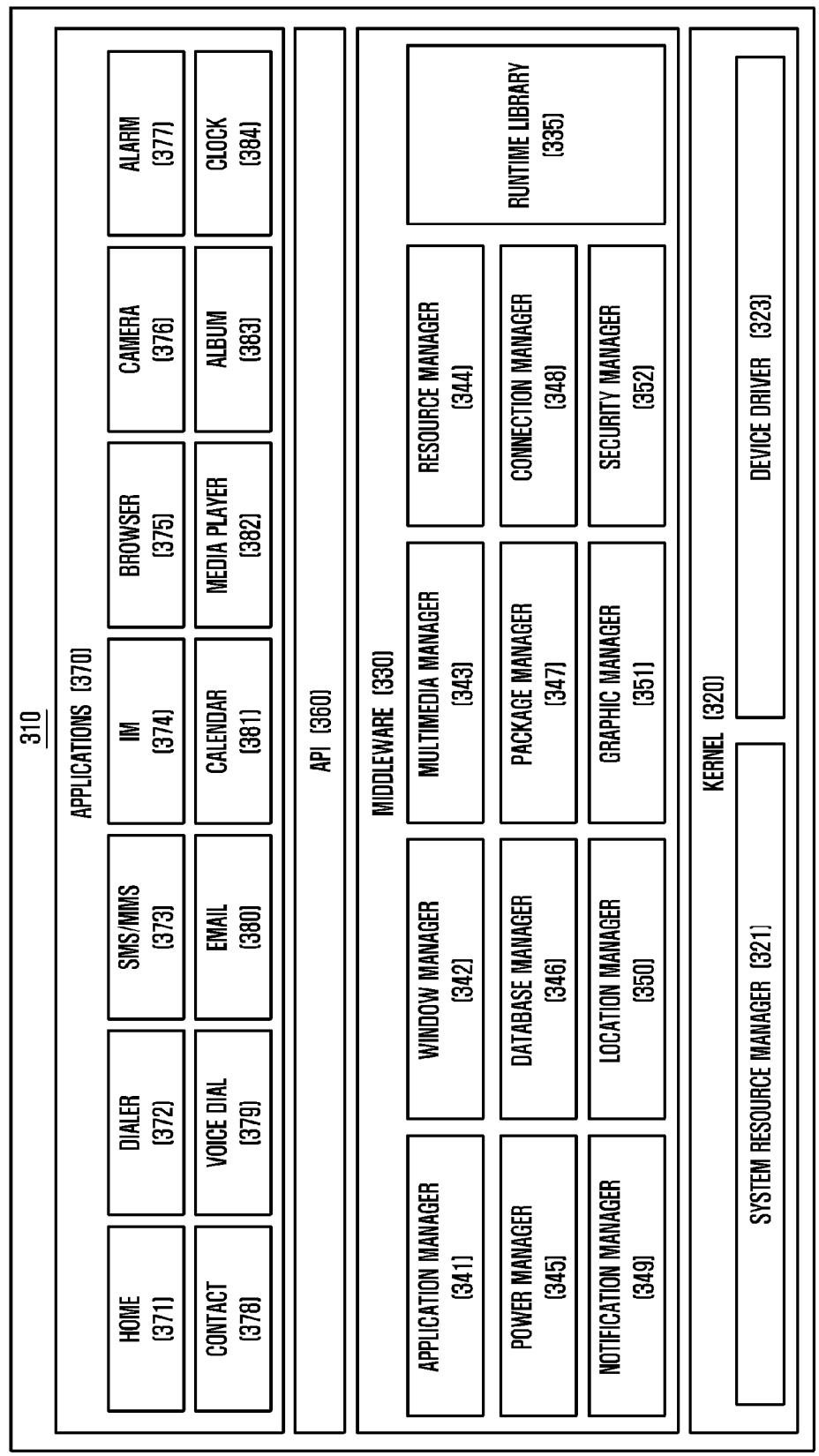
FIG. 3 is a block diagram of a program module according to an embodiment of the present disclosure.

FIG. 3 is a block diagram of a programming module according to an embodiment of the present disclosure.

Referring to FIG. 3, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, short message service (SMS)/multi-media message service (MMS) 373, instant message (IM) 374, browser 375, camera 376, alarm 377, contact 378, voice dial 379, email 380, calendar 381, media player 382, album 383, and clock 384. Furthermore, although not shown, the applications 370 may also include health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

According to an embodiment, the applications 370 are capable of including an application (e.g., a health care application of a mobile medical device, etc.) having specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4:
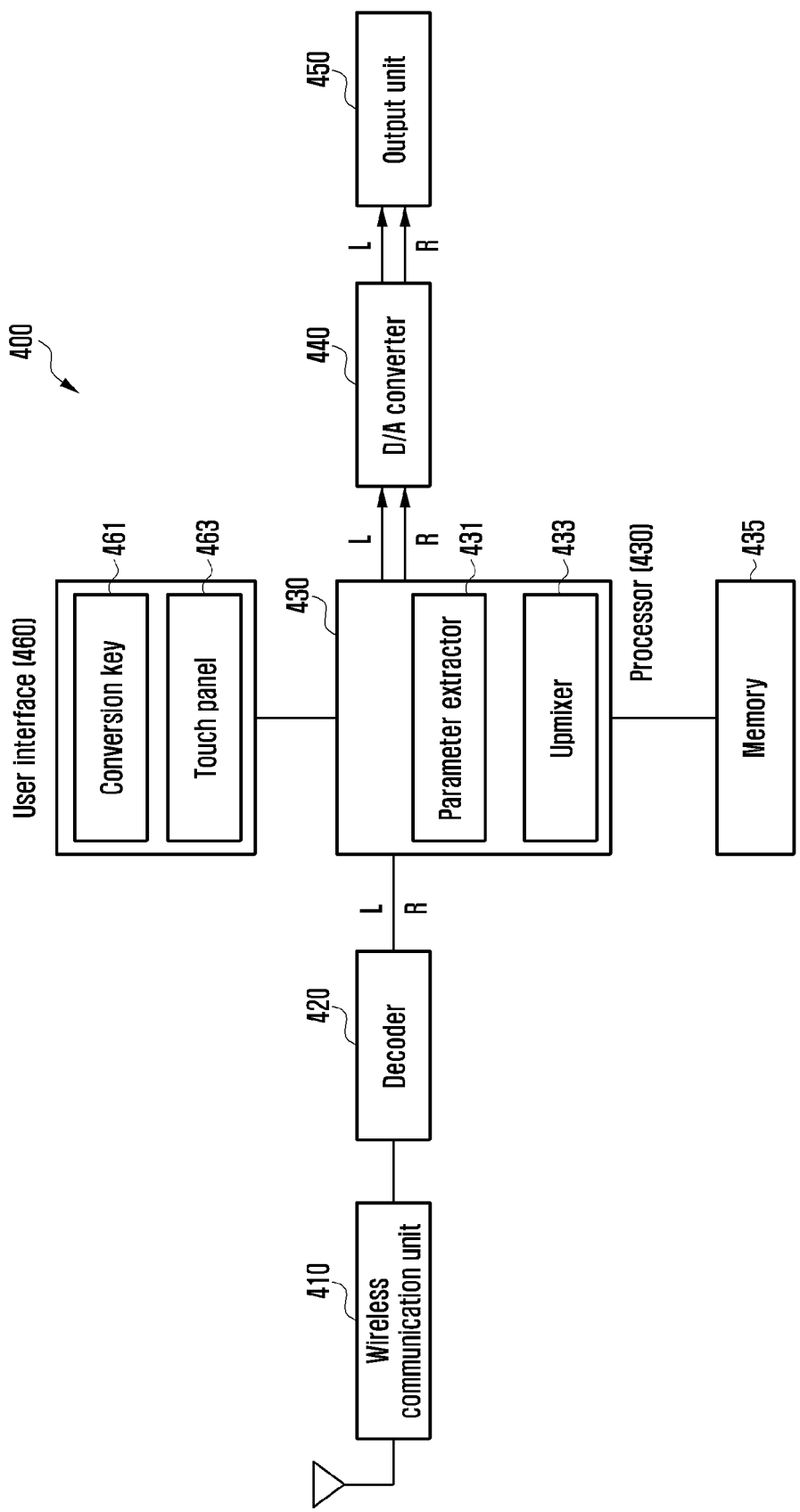
FIG. 4 is a diagram illustrating a configuration of an electronic device according to an embodiment of the present disclosure.

FIG. 4 is a diagram illustrating a configuration of an electronic device according to an embodiment of the present disclosure.

Referring to FIG. 4, a user of an electronic device 400 may be in other communication environments besides communication environments (for example: handsfree, Bluetooth stereo speaker, or the like) in which he/she may feel a stereo effect.

As illustrated in FIG. 4, the electronic device 400 may include a wireless communication unit 410, a decoder 420, a processor 430, a memory 435, a D/A converter 440, an output unit 450, and a user interface 460.

According to various embodiments of the present disclosure, the wireless communication unit 410 may perform a communication function of the electronic device 400. The wireless communication unit 410 may form a communication channel with the network 162 (for example: 162 of FIG. 1) to support at least one of voice communication, image communication, and data communication functions with at least one external device 102, 104, and 106 as illustrated in FIG. 1. The wireless communication unit 410 may include various communication modules, such as mobile communication modules (at least one module that may support various call types such as 2G, 3G, and 4G), a Wi-Fi module, and a near field communication module. The wireless communication unit 410 may include an RF transmitter that up-converts and amplifies a frequency of the transmitted signal, an RF receiver that low-noise-amplifies the received signal and down-converts a frequency of the received signal, or the like. Further, the wireless communication unit 410 may receive a data through a radio channel and transmits the received data to the processor 430 and transmit the data output from the processor 430 to the external device through the radio channel.

According to various embodiments of the present disclosure, the wireless communication unit 410 may be a communication circuit that may support an audio signal, which is transmitted from at least one electronic devices (for example: 102, 104, and 106 of FIG. 1) during a call, by a first type (for example: stereo type) and a second type (for example: mono type). The wireless communication unit 410 may receive the audio signal through a network by the stereo type or the mono type.

According to various embodiments of the present disclosure, the decoder 420 may decode the audio signal received through the wireless communication unit 410 and output the decoded stereo audio signal or mono audio signal.

According to various embodiments of the present disclosure, the processor 430 may perform a function of controlling the general operation of the electronic device 400 and a signal flow between internal components thereof and processing a data. The processor 430 may be formed in, for example, a CPU, an application processor, a communication processor, or the like. The processor 430 may be formed in a single core processor or a multi-core processor and may be formed in a plurality of processors.

According to various embodiments of the present disclosure, the processor 430 may extract stereo parameters from the output signals output through the wireless communication unit 410 and the decoder and upmix a mono signal to a stereo signal at the time of a conversion from a stereo call type to a mono call type due to a change in network environment like a handover to support an optimal stereo call service.

According to an embodiment of the present disclosure, the processor 430 may be configured to confirm condition information associated with the network, use the audio signal changed from the stereo call type to the mono call type to generate other audios signals (for example: virtual stereo signal) corresponding to the stereo type from the network when the condition information belongs to the set condition, and output the other audio signals through the audio output unit 450 functionally connected to the electronic device 400. The condition information associated with the network may include, for example, a network change from an LTE network to a 3G network, a change in communication state of the network like received sensitivity and throughput, a change in network like a handover, or the like.

According to an embodiment of the present disclosure, the processor 430 may be configured to store parameters associated with the stereo call type in the memory 435 on the basis of an operation of receiving an audio signal by the stereo call type. The parameters may be generated while the electronic device 400 performs the stereo call with the external electronic device and may be generated at the handover timing of the network, the parameters corresponding to the stereo signal and the parameters preset in the server (for example: 160 of FIG. 1) may be received from the network at the time of the handover, and the preset parameters stored in the memory 435 may be used. The parameters associated with the stereo call type may previously generate the parameters for supporting a plurality of different modes (for example: voice over LTE (VoLTE), mono) at the time of the generation of the parameters and store the previously generated parameters in the memory 435.

According to an embodiment of the present disclosure, the processor 430 may be configured to generate other audio signals (for example: virtual stereo signal) on the basis of the parameters. The processor 430 may be configured to use the parameters associated with the stereo call type received from the network and the audio signal changed by the mono call type when the condition information belongs to the set condition, thereby generating the other audio signals. The processor 430 may be configured to confirm whether another network supports the stereo call type when the connection between the electronic device 400 and the external electronic device is changed from one network to another network and generate other audio signals when the stereo call type is not supported.

According to various embodiments of the present disclosure, the processor 430 may include a parameter extractor 431 and an upmixer 433.

According to various embodiments of the present disclosure, the parameter extractor 431 may receive a left (L) channel signal and a right (R) channel signal output through the decoder 420. The parameter extractor 431 may use a characteristic relationship between the received two channel (left (L) channel and right (R) channel) signals to extract parameters (interchannel phase difference (IPD), interchannel level difference (ILD), interchannel coherence (IC), and overall phase difference (OPD)) required for stereo upmixing.

Figure 5:
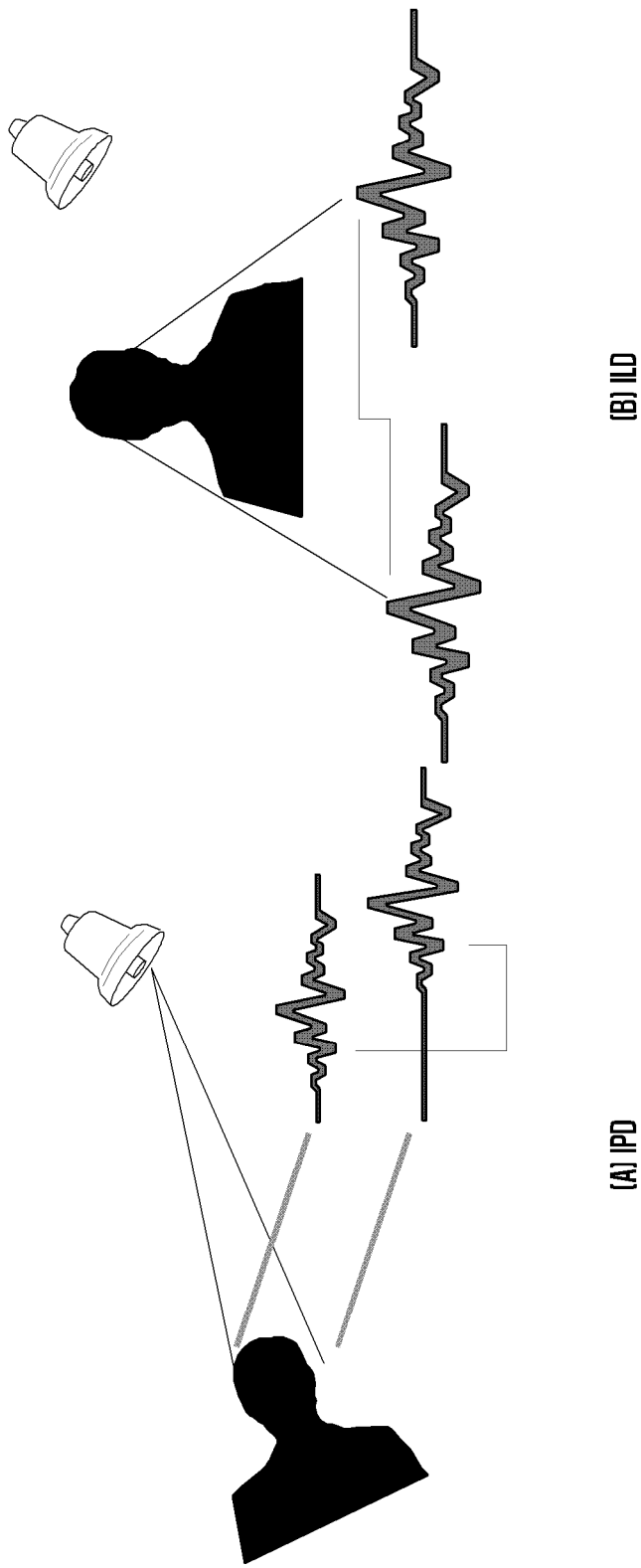
FIG. 5 is a diagram for illustrating an interchannel phase difference (IPD) and an interchannel level difference (ILD) according to various embodiments of the present disclosure.

FIG. 5 is a diagram for illustrating an IPD and an ILD according to various embodiments of the present disclosure.

Referring to FIG. 5, for the electronic device 400 to implement the virtual stereo output, the extraction of the IPD, ILD, and IC parameters may be required. The IPD may represent a time difference when a target sound source from the external device is input to the left and right channels of the electronic device 400, the ILD may represent a difference in levels that are input to the left and right channels of the electronic device 400, and the IC may represent coefficients using the time difference and the level difference.

For example, as illustrated in FIG. 5, the IPD may appreciate a direction of a sound source by allowing an ear at a direction near a side where a sound is generated to first listen to the sound, the ILD may appreciate a position of the sound source depending on a level of the sound. The mono sound may be converted into the stereo sound by a combination of the IPD and ILD parameters. According to an embodiment of the present disclosure, a phase difference may be adjusted depending on the level and the distance of the mono sound. Further, the same effect as the stereo sound source may appear at the time of the image communication of the electronic device 400 with the external electronic device on the basis of the IC parameters using the time difference and the level difference or when the position and the moving direction of the target sound source and a variable for the size of the sound source may be set or confirmed.

Figure 6:
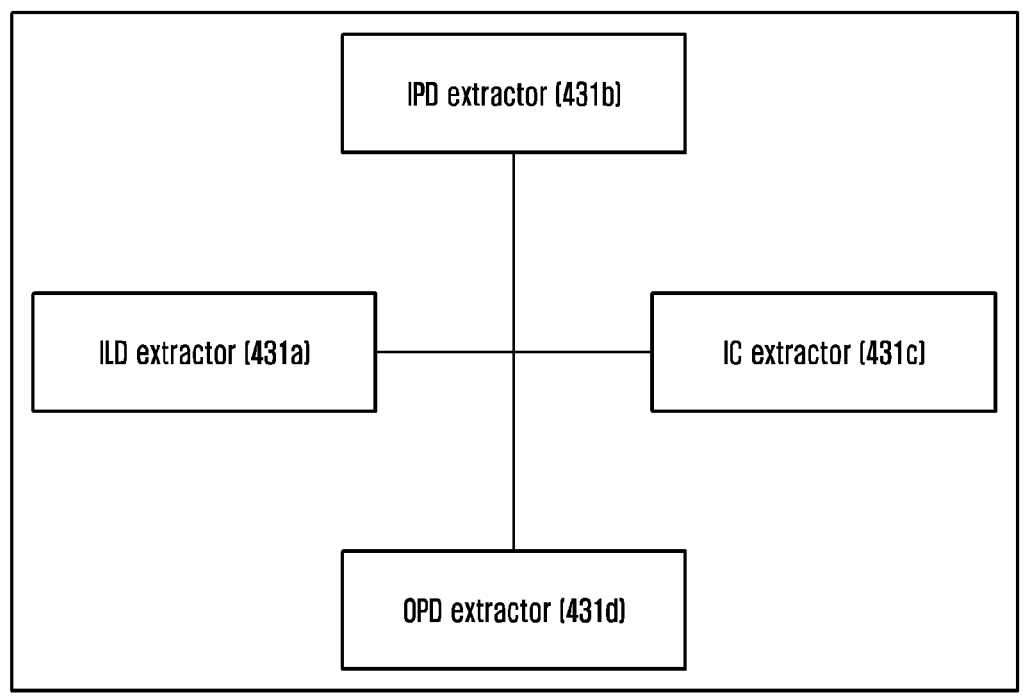
FIG. 6 is a diagram illustrating a configuration of a parameter extractor according to an embodiment of the present disclosure.

FIG. 6 is a diagram illustrating a configuration of a parameter extractor according to an embodiment of the present disclosure.

Referring to FIG. 6, the parameter extractor 431 may include an ILD extractor 431a, an IPD extractor 431b, an IC extractor 431c, and an OPD extractor 431d.

According to various embodiments of the present disclosure, the ILD extractor 431a may extract parameters representing an intensity difference depending on energy levels of the left channel signal and the right channel signal output through the decoder 420, the IPD extractor 431b may extract parameters representing a phase difference between the left channel signal and the right channel signal output through the decoder 420, the IC extractor 431c may extract parameters representing a correlation depending on similarity of waveforms between the left channel signal and the right channel signal output through the decoder 420, and the OPD extractor 431d may extract parameters representing how the phase difference between the left channel signal and the right channel signal output through the decoder 420 is distributed on the basis of the mono signal.

The foregoing embodiment of the present disclosure describes that the parameter extractor 431 separately includes the ILD extractor 431a, the IPD extractor 431b, the IC extractor 431c, and the OPD extractor 431d, but the parameter extractor 431 may also directly extract the corresponding parameters.

Referring again to FIG. 4, the upmixer 433 may receive the mono signal decoded by the decoder 420 and generate the stereo signal by upmixing the received mono signal to the left channel signal and the right channel signal. The upmixing may generate stereo signals of at least two channels from a mono signal of one channel.

According to various embodiments of the present disclosure, the memory 435 may perform a function of storing a program for processing and controlling the processor 430, an OS, various applications, and input/output data and may store programs that control an overall operation of the electronic device 400. The memory 435 may store a user interface (UI) provided from the electronic device 400 and store various setup information required for function processing in the electronic device 400.

According to various embodiments of the present disclosure, the memory 435 may store the IPD, ILD, IC, and OPD parameters required for the stereo upmixing that are extracted through the parameter extractor 431. The memory 435 may store stereo parameters extracted by channel from the stereo signals including the left channel signal and the right channel signal output through the decoder 420.

According to various embodiments of the present disclosure, the D/A converter 440 converts a digital audio signal output from the processor 430 into an analog audio signal.

According to various embodiments of the present disclosure, the output unit 450 may include a speaker through which an audio signal (transmitting sound or receiving sound) transmitted and received at the time of the communication with the external electronic device, an audio signal included in the received message, an audio signal depending on playing of an audio file stored in the memory 435, or the like are output as the stereo signal or the mono signal. For example, the output unit 160 may output audio signals depending on a call sound, the playing of the audio file, playing of a moving picture file, game execution, or the like through the handsfree, the Bluetooth stereo speaker, or the like.

According to various embodiments of the present disclosure, the user interface 460 may transmit commands or data input from the user of the electronic device 400 or the external electronic device to other component(s) of the electronic device 400 or output the command or the data received from other component(s) of the electronic device 400 to the user or the external electronic device.

According to various embodiments of the present disclosure, the user interface 460 may support the conversion into the stereo call at the time of the mono call in the network that does not support the stereo call. The user interface 460 may include a conversion key 461 and a touch panel 463.

According to various embodiments of the present disclosure, the conversion key 461 may generate various input signals required for the operation of the electronic device 400. The conversion key 461 may receive the user setup and the conversion operation of the user for controlling the electronic device 400 and generate the input signal and transmit the generated input signal to the processor 430. The processor 430 may control other functions in response to the input signal.

According to various embodiments of the present disclosure, the processor 430 may convert a mono call into a stereo call depending on the conversion operation of the conversion key 461. The conversion key 461 may be configured as a key pad including a numeric key and a direction key and may include a predetermined physical function key formed on one surface of the electronic device 400.

According to various embodiments of the present disclosure, the touch panel 463 may sense the touch input of the user and may perform a function of displaying a screen depending on the input. For example, when a user's finger, a stylus, or the like that are a touch input tool contact or approach the touch panel, they may generate a touch event and transmit the generated touch event to the processor 430. For example, the touch panel 463 may recognize the generation of the touch event on the basis of a change in a physical amount (for example, a capacitance value, a resistance value, or the like) depending on the contact or the approach of the touch input tool. The touch panel 463 may further include an electromagnetic induction type touch panel for recognizing an electromagnetic induction type electronic pen.

According to various embodiments of the present disclosure, the touch panel 463 may support the processor 430 to convert the mono call into the stereo call as the user manipulates applications that may be converted.

Figure 7A:
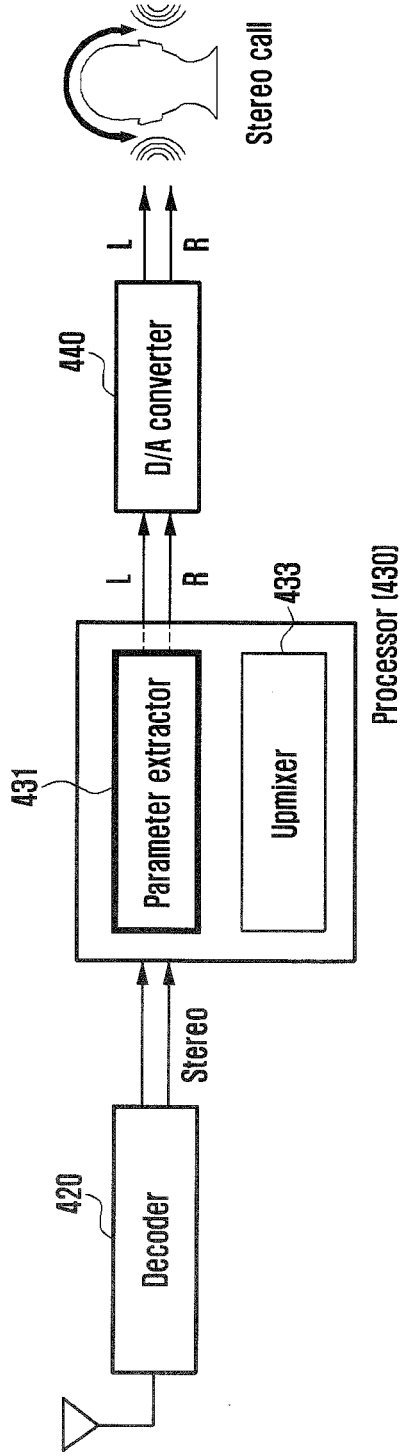
FIG. 7A is a diagram for describing a condition of an electronic device at a time of a stereo call according to an embodiment of the present disclosure.

FIG. 7A is a diagram for describing a condition of an electronic device at a time of stereo call according to an embodiment of the present disclosure.

Figure 7B:
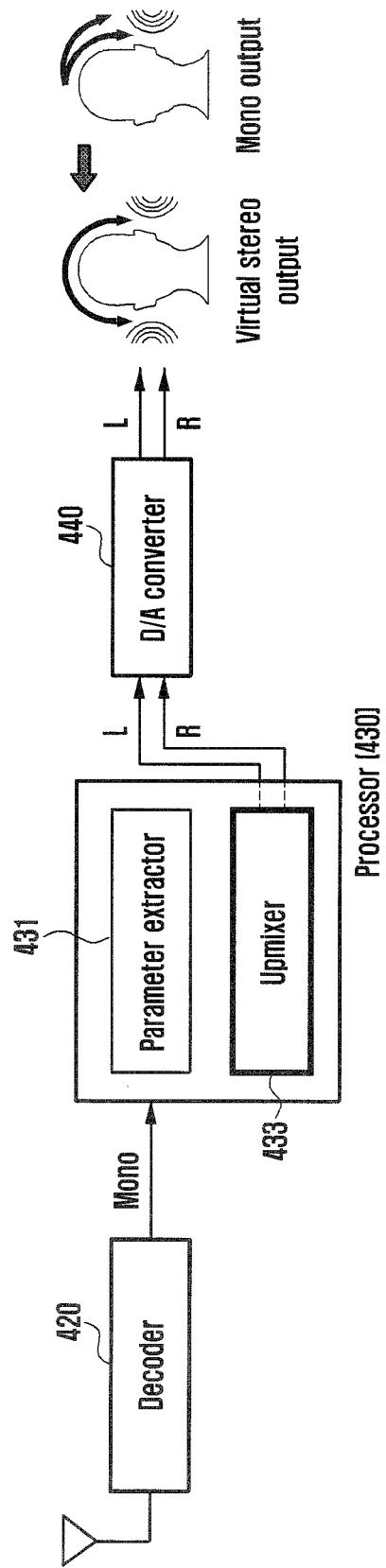
FIG. 7B is a diagram for describing a condition of an electronic device at a time of a generation of handover to a mono call according to an embodiment of the present disclosure.

FIG. 7B is a diagram for describing a condition of an electronic device at a time of a generation of handover to a mono call according to an embodiment of the present disclosure.

Referring to FIG. 7A, when the electronic device 400 performs a stereo call with an external electronic device, the stereo audio signal received through the wireless communication unit 410 may be decoded by the decoder 420 and the decoded stereo audio signal may be output to the parameter extractor 431 of the processor 430. The parameter extractor 431 may extract the foregoing IPD, ILD, IC, and OPD parameters from the left (L) and right (R) channel stereo signals output through the decoder 420. The processor 430 may store the extracted parameters in the memory 435. The processor 430 may output the left (L) and right (R) channel stereo signals to the D/A converter 440 and the D/A converter 440 may convert the stereo signal output from the processor 430 into the analog audio signal and output the analog audio signal to the output unit 450. Therefore, the electronic device 400 may perform the stereo call with the external electronic device.

As described with reference to FIG. 7A, the electronic device 400 may generate the handover converted into the mono call while the electronic device 400 performs the stereo call with the external electronic device.

Referring to FIG. 7B, the decoder 420 may output the mono signal to the processor 430. The processor 430 may use the upmixer 433 embedded therein to upmix the mono signal received from the decoder 420 to the left (L) and right (R) channel signals to generate the stereo signal and output the generated stereo signal to the D/A converter 440. The D/A converter 440 may convert the stereo signal output from the processor 430 into the analog audio signal and output the analog audio signal to the output unit 450. Therefore, when the electronic device 400 performs the stereo call with the external electronic device, the handover is generated and thus even if the stereo call is converted into the mono call, the stereo call is converted into the virtual stereo call by the upmixer 433 and then the stereo call may be continuously performed without changing the call sound quality.

Figure 8:
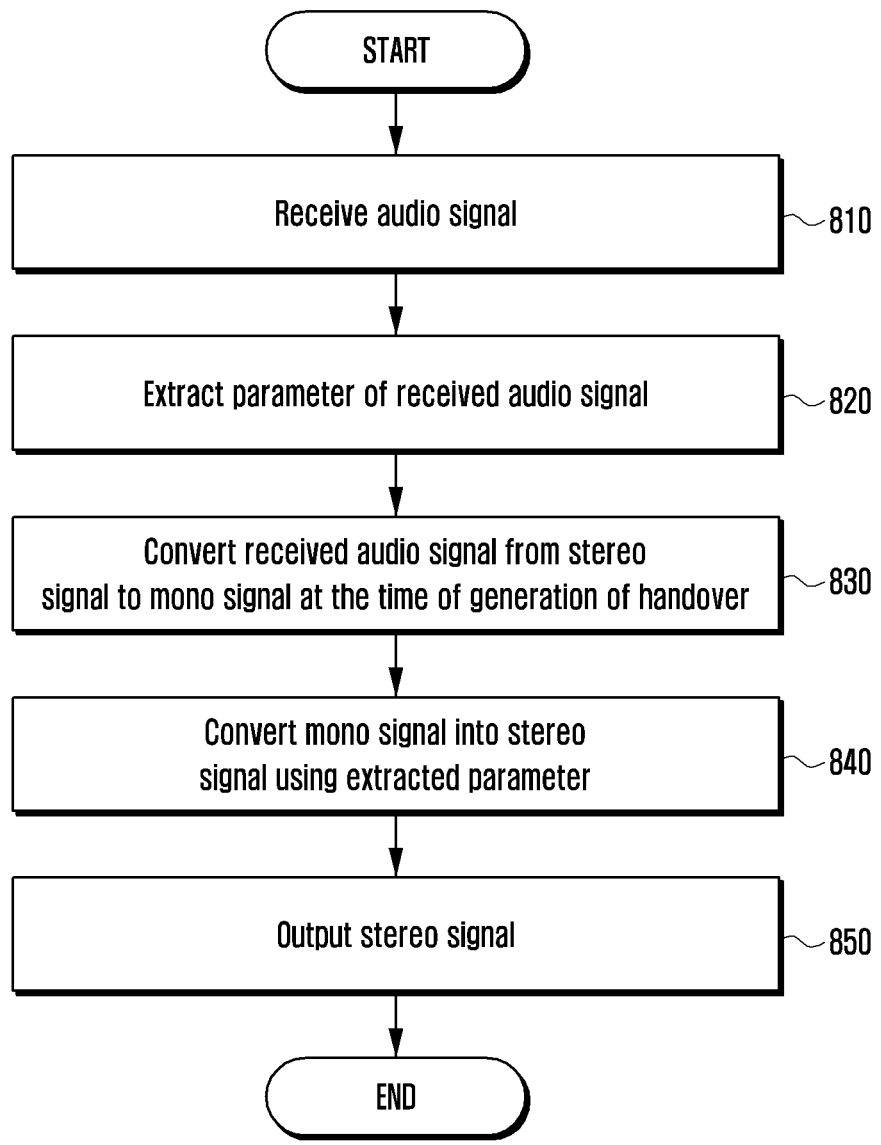
FIG. 8 is a flowchart illustrating an example of a method for converting a call type of an electronic device according to an embodiment of the present disclosure.

FIG. 8 is a flowchart illustrating an example of a method for converting a call type of an electronic device according to an embodiment of the present disclosure.

Referring to FIG. 8, in operation 810, the wireless communication unit 410 of the electronic device 400 may receive a stereo audio signal from an external electronic device.

In operation 820, the processor 430 of the electronic device 400 may use the parameter extractor 431 to extract the IPD, ILD, IC, and OPD parameters from the received stereo signal.

In operation 830, if the handover is generated while the electronic device 400 communicates with the external electronic device over the phone through the stereo signal, the received stereo signal may be converted into the mono signal.

In operation 840, the processor 430 of the electronic device 400 may upmix the extracted parameter signals using the upmixer 433 to convert the converted mono signal into the stereo signal.

In operation 850, the output unit 450 of the electronic device 400 may output the converted stereo signal. Therefore, the user of the electronic device 400 may continuously perform the stereo call even in the condition that the handover is generated while talking over the phone through the stereo signal.

Figure 9:
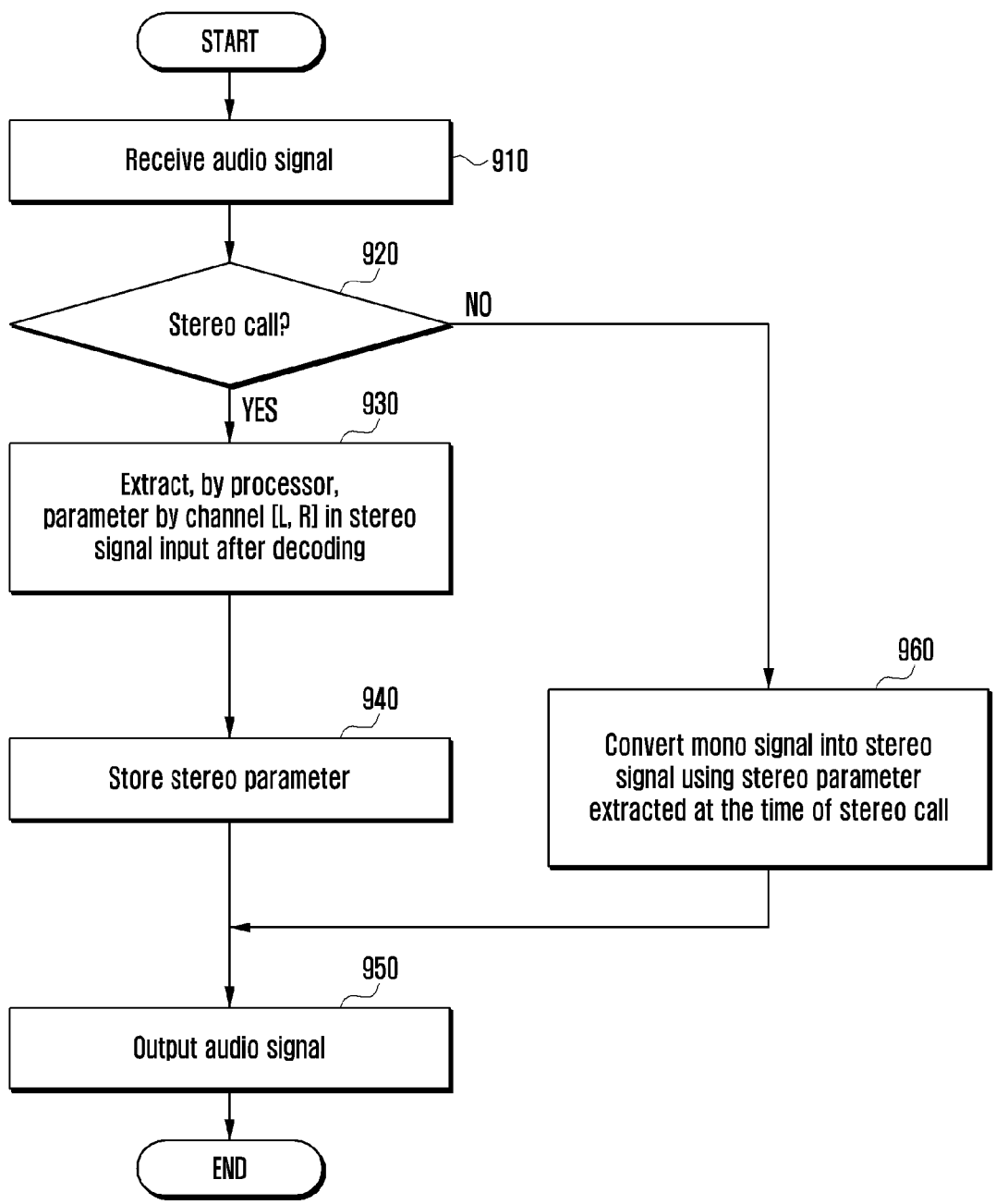
FIG. 9 is a flowchart illustrating an example of a method for converting a call type of an electronic device according to an embodiment of the present disclosure.

FIG. 9 is a flowchart illustrating an example of a method for converting a call type of an electronic device according to an embodiment of the present disclosure.

Referring to FIG. 9, in operation 910, the wireless communication unit 410 of the electronic device 400 may receive a stereo or a mono audio signal from an external electronic device.

In operation 920, the processor 430 of the electronic device 400 may determine whether the call with the external electronic device is the stereo call.

Based on the determination result of operation 920, if it is determined that the call with the external electronic device is the stereo call, in operation 930, the processor 430 may extract the stereo parameters for the IPD, the ILD, the IC, and the OPD by left channel and right channel from the stereo signal received through the decoder 420.

In operation 940, the processor 430 may store the extracted stereo parameters in the memory 435 and in operation 950, output the stereo audio signal through the output unit 450.

Meanwhile, as the determination result of the operation 920, if the call with the external electronic device is the mono call, in operation 960, the processor 430 may use the extracted stereo parameters that are stored in the memory 435 to convert the mono signal into the virtual stereo signal and then output the virtual stereo signal through the output unit 450. The handover is generated while the electronic device 400 performs the stereo call with the external electronic device, and thus the mono call may be the mono signal converted in the stereo call.

Figure 10:
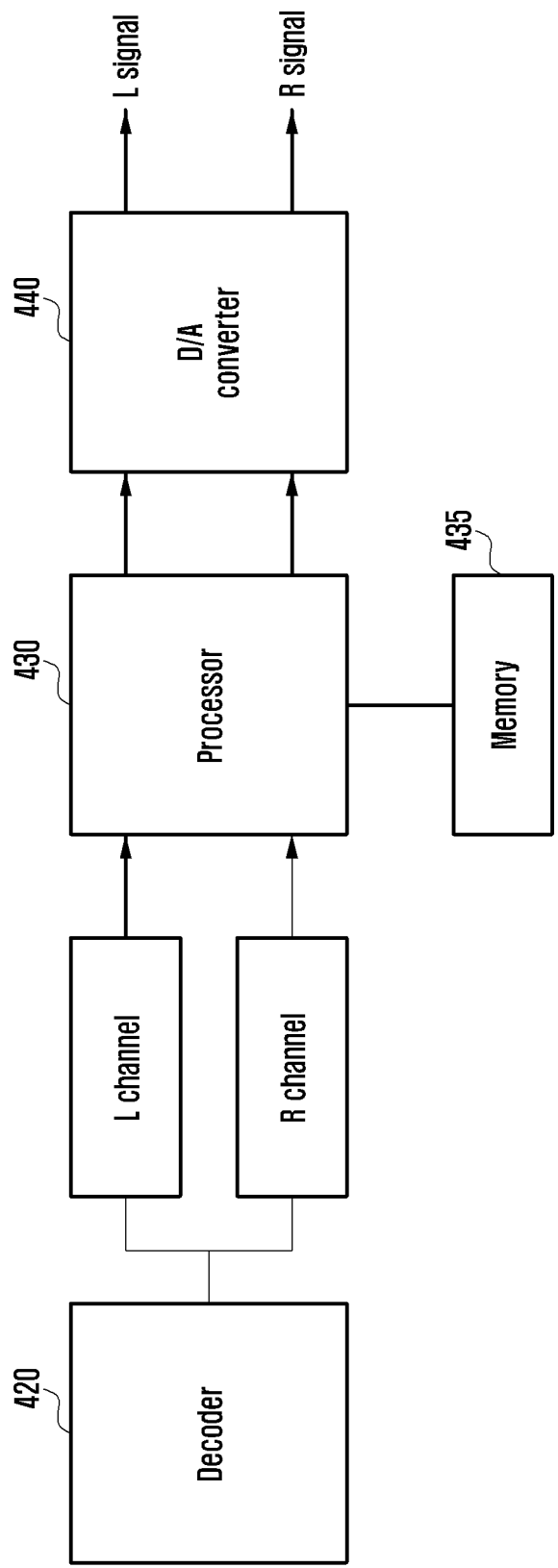
FIG. 10 is a diagram for describing an example in which a mono signal is upmixed to a stereo signal at a time of a generation of handover according to an embodiment of the present disclosure.

FIG. 10 is a diagram for describing an example in which a mono signal is upmixed to a stereo signal at a time of a generation of handover according to an embodiment of the present disclosure.

Referring to FIG. 10, an example is provided in which, if the handover to the wideband (WB) network or the 3G network at the time of enhanced voice services (EVS) communication like 3GPP is generated and thus the conversion into the mono call is made, the mono call is converted into the stereo call again.

As illustrated in FIG. 10, when the electronic device 400 performs the stereo call with the external electronic device, the processor 430 may extract the IPD, ILD, IC, and OPD stereo parameters by left channel and right channel from the stereo signal received through the decoder 420 and store the extracted stereo parameters in the memory 435. When the handover from a network such as the 3GPP EVS, which supports the stereo call, to a network such as the WB network and the 3G network, which do not support the stereo call, is generated, the processor 430 may use the stereo parameter stored in the memory 435 to upmix the mono signal and output the upmixed signal to the D/A converter 440 for the right (R) channel to the stereo signal, thereby performing the stereo call.

Figure 11:
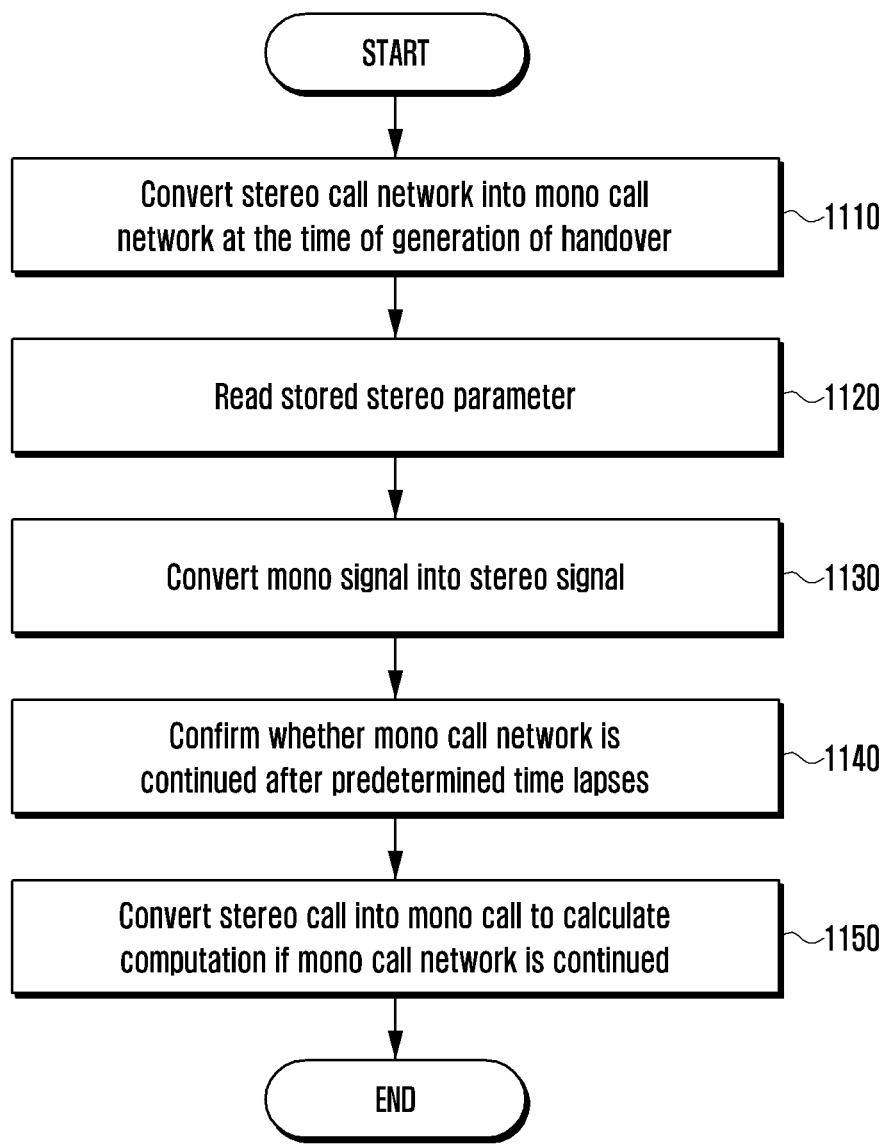
FIG. 11 is a flowchart illustrating an example of a method for converting a call type of an electronic device according to an embodiment of the present disclosure.

FIG. 11 is a flowchart illustrating an example of a method for converting a call type of an electronic device according to an embodiment of the present disclosure.

Referring to FIG. 11, a flowchart is illustrated for describing an example in which, when a mono call is continued between the electronic device 400 and the external electronic device, a stereo call is converted into the mono call to improve the computation of the electronic device.

In operation 1110, if the handover is generated while the electronic device 400 performs the stereo call with the external electronic device, the stereo call network may be converted into the mono call network.

In operation 1120, the processor 430 of the electronic device 400 may read the stereo parameters stored in the memory 435. The processor 430 may extract the IPD, ILD, IC, and OPD stereo parameters by left (L) channel and right (R) channel from the stereo signal received through the decoder 420 and store the extracted stereo parameters in the memory 435.

In operation 1130, the processor 430 of the electronic device 400 may upmix the parameter signals read from the memory 435 using the upmixer 433 to convert the converted mono signal into the stereo signal.

In operation 1140, the processor 430 may confirm whether the electronic device 400 is continued to be in the mono call network region after a predetermined time lapses.

In operation 1150, when the electronic device 400 is continued to be in the mono call network region, the processor 430 may convert the stereo call into the mono call to improve the computation of the electronic device 400.

Figure 12:
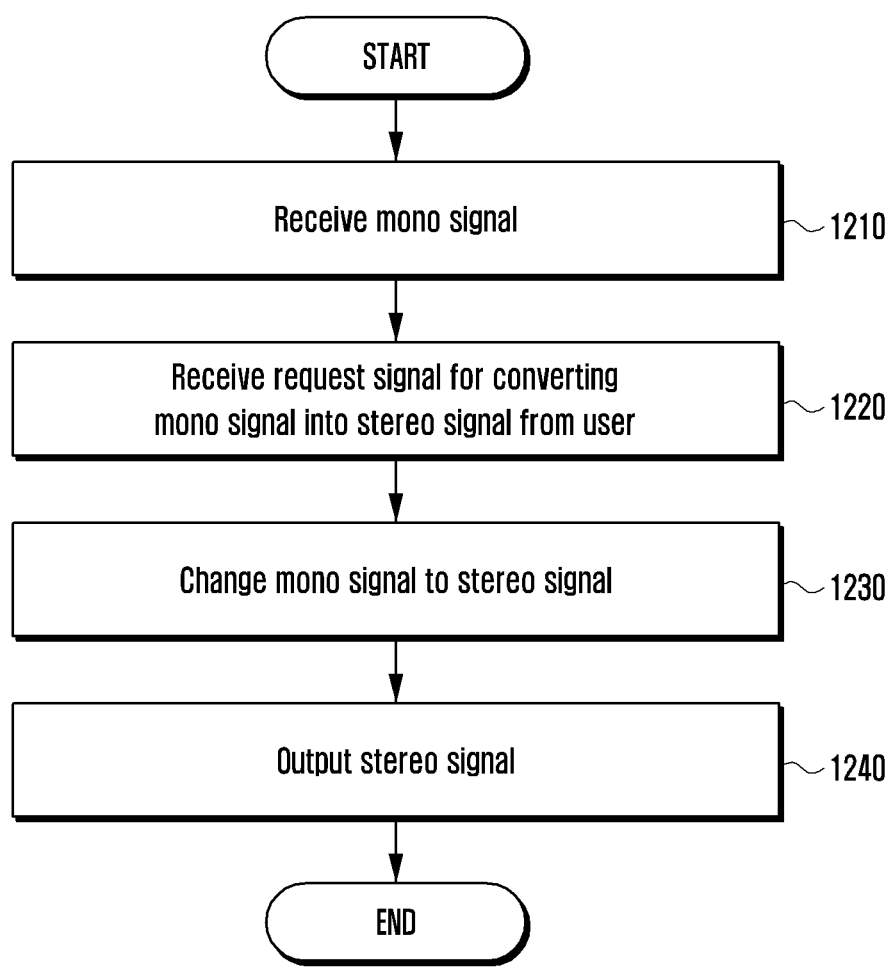
FIG. 12 is a flowchart illustrating an example of a method for converting a call type of an electronic device according to an embodiment of the present disclosure.

FIG. 12 is a flowchart illustrating an example of a method for converting a call type of an electronic device according to an embodiment of the present disclosure.

Referring to FIG. 12, a method is described in which, when the electronic device 400 performs a mono call with an external electronic device, the mono call is converted into the stereo call by the user setup.

In operation 1210, the wireless communication unit 410 of the electronic device 400 may receive the mono signal from the external electronic device. In this case, the electronic device 400 may be in the network environment that does not support the stereo call.

In operation 1220, the electronic device 400 may receive a request signal to covert the mono signal into the stereo signal from the user. The conversion setup from the mono signal of the electronic device 400 into the stereo signal may be performed by the manipulation of the conversion key 461 of the user interface 460 or the touch of the touch panel 463, as described above.

In operation 1230, the electronic device 400 may read the stereo parameters stored in the memory 435 to convert the mono signal into the stereo signal, according to the user request.

In operation 1240, the processor 430 may output the converted stereo signal through the output unit 450.

Therefore, the electronic device 400 may continue to perform the stereo call without deterioration in call sound quality according to the user setup even if the electronic device 400 is in the network environment that does not support the stereo call.

Figure 13A:
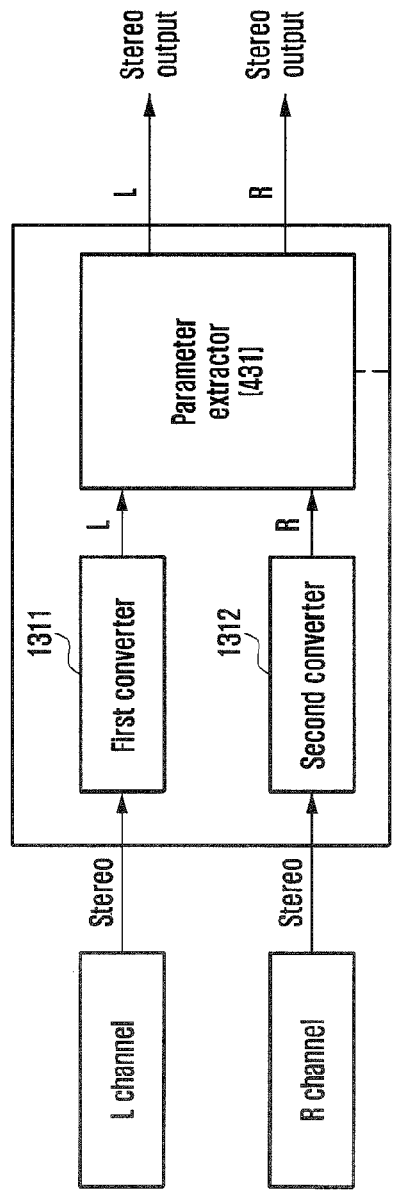
FIG. 13A is a diagram illustrating a configuration of extracting parameters from a stereo signal of an electronic device according to an embodiment of the present disclosure.

FIG. 13A is a diagram illustrating a configuration of extracting parameters from a stereo signal of an electronic device according to an embodiment of the present disclosure.

Figure 13B:
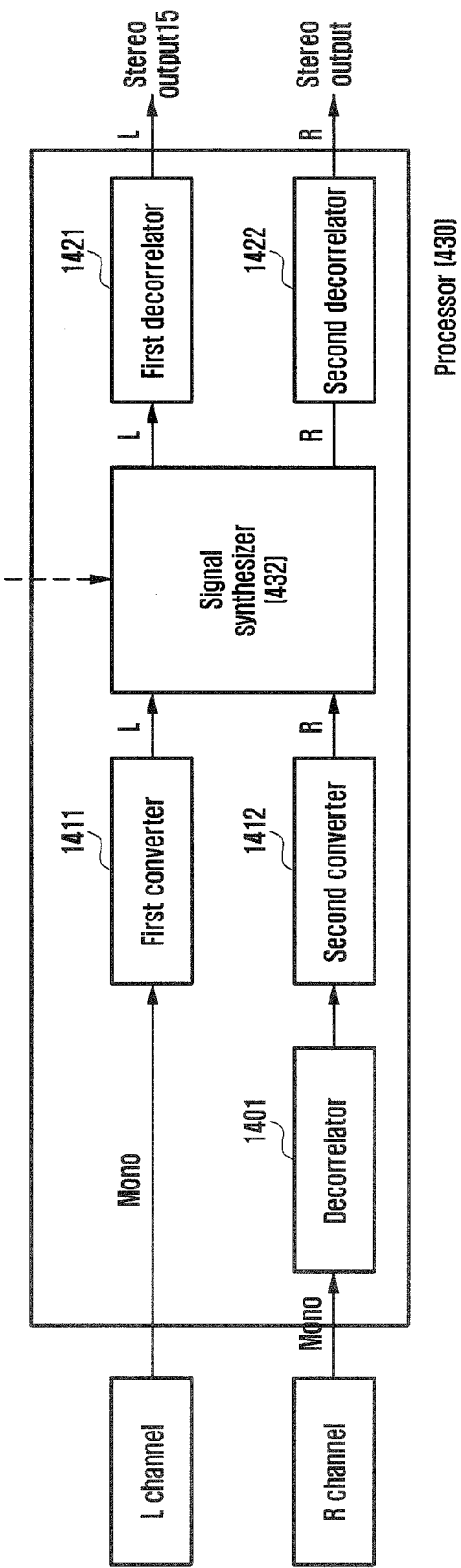
FIG. 13B is a diagram illustrating a configuration of synthesizing a stereo signal of an electronic device with a mono signal thereof according to an embodiment of the present disclosure.

FIG. 13B is a diagram illustrating a configuration of synthesizing a stereo signal of an electronic device with a mono signal thereof according to an embodiment of the present disclosure.

Referring to FIG. 13A, the processor 430 of the electronic device 400 may include a first converter 1311, a second converter 1312, and a parameter extractor 431.

The first converter 1311 may convert a left (L) channel stereo audio signal frame received from the external electronic device through the wireless communication unit 410 into a frequency region and output it.

The first converter 1312 may convert a right (R) channel stereo audio signal frame received from the external electronic device through the wireless communication unit 410 into a frequency region and output it.

According to various embodiments of the present disclosure, the first converter 1311 and the second converter 1312 may be a fast Fourier transform (FFT) converter that performs a Fourier transform on a discrete data at a high speed.

The parameter extractor 431 may use a characteristic relationship between the received two channel (i.e., left (L) channel and right (R) channel) signals to extract parameters (e.g., ILD, IPD, IC, and OPD) required for stereo upmixing. As illustrated in FIG. 6, the parameter extractor 431 may include the ILD extractor 431a, the IPD extractor 431b, the IC extractor 431c, and the OPD extractor 431d.

According to various embodiments of the present disclosure, the ILD is a parameter representing the intensity difference depending on the energy levels of the left channel signal and the right channel stereo audio signal and may be extracted by the following Equation 1.

$$ILD[b] = 10\log_{10} \frac{\sum\limits_{k=k_b}^{k_{b+1}-1} X_1[k]X_1^*[k]}{\sum\limits_{k=k_b}^{k_{b+1}-1} X_2[k]X_2^*[k]} \qquad \text{Equation 1}$$

In Equation 1, b may represent a frequency band index, $X_1$ may represent the left (L) channel signal, $X_2$ may represent the right (R) channel signal, numerator/denominator=power of $X_1$ (left channel signal)/power of $X_2$ (right channel signal), k may represent k frequencies, and * may represent a complex conjugate. $X_1^*$ is a complex conjugate of the $X_1$ (left channel signal), in which a signal of an imaginary part of the $X_1$ may represent an opposite signal and $X_2^*$ is a complex conjugate of the $X_2$ (right channel signal), in which a signal of an imaginary part of the $X_2$ may represent an opposite signal. The ILD may be extracted using a ratio of $X_1$ (left channel signal) and $X_2$ (right channel signal) by frequency band b. For example, if values of the $X_1$ (left channel signal) and the $X_2$ (right channel signal) are equal, the ILD value may be extracted as 1, like the mono signal.

For reference, b may be a value obtained by distributing the frequency after the conversion into the frequency region. For example, a general conversation signal when the electronic device communicates with the external electronic device may use a critical bandwidth and when music is output through the electronic device, an equivalent rectangular bandwidth (ERB) may be used. The extraction values by frequency band b may be obtained at the time of the extraction of the ILD and if a computation issue is generated, the number of frequency bands may also be set differently.

According to various embodiments of the present disclosure, the IPD is a parameter representing the phase difference of the left channel signal and the right channel stereo audio signal and may be extracted by the following Equation 2.

$$IPD[b] = \angle \left( \sum_{k=k_b}^{k_{b+1}-1} X_1[k] X_2^*[k] \right) \quad \text{Equation 2}$$

In Equation 2, b may represent a frequency band index, ∠ may represent the phase of ( ), $X_1$ may represent the left (L) channel signal, $X_2$ may represent the right (R) channel signal, k may represent k frequencies, and * may represent a complex conjugate. $X_2^*$ is a complex conjugate of $X_2$ (right channel signal), in which the signal of the imaginary part of $X_2$ may represent the opposite signal. The IPD may be a value obtaining an angle of a product value of $X_1$ (a+bi) and $X_2$ (c−di) by frequency band b. If the values of the $X_1$ (left channel signal) and the $X_2$ (right channel signal) are equal, the IPD becomes 0 and may have result values of −pi/2 to pi/2.

According to various embodiments of the present disclosure, the IC is a parameter representing the correlation depending on the similarity of waveforms between the left channel signal and the right channel signal and may be extracted by the following Equation 3.

$$IC[b] = \frac{C \sum_{k=k_b}^{k_{b+1}-1} X_1[k] X_2^*[k] C}{\sqrt{\left( \sum_{k=k_b}^{k_{b+1}-1} X_1[k] X_1^*[k] \right) \left( \sum_{k=k_b}^{k_{b+1}-1} X_2[k] X_2^*[k] \right)}} \quad \text{Equation 3}$$

In Equation 3, b may represent a frequency band index, $X_1$ may represent the left (L) channel signal, $X_2$ may represent the right (R) channel signal, k may represent k frequencies, and * may represent a complex conjugate. $X_1^*$ is a complex conjugate of the $X_1$ (left channel signal), in which a signal of an imaginary part of the $X_1$ may represent an opposite signal and $X_2^*$ is a complex conjugate of the $X_2$ (right channel signal), in which a signal of an imaginary part of the $X_2$ may represent an opposite signal. The IC is a value obtained by normalizing the $X_1$ (left channel signal) and the $X_2$ (right channel signal) and if the $X_1$ (left channel signal) and the $X_2$ (right channel signal) are equal, the IC value may be extracted as 1, like the mono signal.

According to various embodiments of the present disclosure, the OPD is a parameter representing how the phase difference between the left channel signal and the right channel stereo audio signal is distributed based on the mono signal and may be extracted by the following Equation 4.

$$OPD[b] = \angle \left( \sum_{k=k_b}^{k_{b+1}-1} X_1[k] S^*[k] \right) \quad \text{Equation 4}$$

$$S[k] = w_1 X_1[k] + w_2 X_2[k]$$

In Equation 4, b may represent a frequency band index, ∠ may represent the phase of ( ), $X_1$ may represent the left (L) channel signal, $X_2$ may represent the right (R) channel signal, S represents a mixing value (average value) of the left (L) channel signal and the right (R) channel signal, and w may represent weighting. The OPD may be used to define the reference value when the mono signal is converted into the stereo signal at the time of the generation of the handover, using the delay information of the $X_1$ (left channel signal) and the average signal. The coefficients used in the above Equation 4 do not have a reference value as a relative value and it may be difficult to differentiate the left channel and the right channel. For example, the delay information may be added to the mixing value (average value) of the left (L) channel signal and the right (R) channel signal reproduced as the mono signal to define the reference value of the left channel as the time delay of the $X_1$ (left channel signal).

Referring to FIG. 13B, the processor 430 of the electronic device 400 may include a decorrelator 1401, a first converter 1411, a second converter 1412, a signal synthesizer 432, a first decorrelator (inverse converter) 1421, and a second decorrelator (inverse converter) 1422.

The decorrelator 1401 may generate an additional signal having a spectral-temporal envelope similar to the mono signal to synthesize the received mono signal with the stereo signal. An output Sd(t) of the decorrelator 1401 and an original signal S(t) may have incoherent (or orthogonal) characteristics to each other. The decorrelator 1401 may include an all pass filter to reproduce a signal having the same spectral-temporal envelope. The all pass filter may increase spatial diffuseness by changing a phase of an output signal of which the magnitude is 1. To make the decorrelator 1401 in the simplest form, the output signal may include a delay.

The first converter 1411 may perform the same function as the first converter 1311 illustrated in FIG. 13A. The first converter 1411 may convert a left (L) channel mono signal frame received from the external electronic device through the wireless communication unit 410 into a frequency region and output it.

The second converter 1412 may convert a right (R) channel decorrelated mono audio signal frame output through the decorrelator 1401 into a frequency region and output it.

The signal synthesizer 432 may synthesize the mono signal with the stereo signal using the original mono signal and the signal output through the decorrelator 1401 For example, the mono signal may be synthesized with the stereo signal using the original mono signal S(t) and the signal Sd(t) output through the decorrelator 1401.

The original mono signal S(t) and the signal Sd(t) output through the decorrelator 1401 are converted into the frequency axis and then the signals may be synthesized using the following Equation 5.

$$\begin{bmatrix} Y_1[k] \\ Y_2[k] \end{bmatrix} = R_B \begin{bmatrix} S[k] \\ S_d[k] \end{bmatrix} \quad \text{Equation 5}$$

In Equation 5, k may represent k frequencies, $Y_1$ may represent the virtual final signal of the left (L) channel, $Y_2$ may represent the virtual final signal of the right (R) channel, S may represent the original mono signal, Sd may represent the signal output through the decorrelator 1401, and $R_B$ may represent the synthesized value of the left (L) channel signal and the right (R) channel signal. According to the above Equation 5, a 2×2 matrix called $R_B$ using S[k] and Sd[k] converted into the frequency base is configured and then the left channel signal and the right channel signal may be generated.

The first inverse converter 1421 and the second inverse converter 1422 may perform an inverse conversion on the left and right channel audio signals having the frequency region output through the signal synthesizer 432 to output the audio signal that does not have noise. The first inverse converter 1421 and the second inverse converter 1422 may each be an IFFT converter that performs a Fourier transform on an inverse discrete data at a high speed.

Referring to FIGS. 13A and 13B as described above, when the electronic device 400 communicates with an external electronic device using a stereo signal, the processor 430 may convert the left (L) and right (R) channels into the frequency region, extract the ILD, IPD, IC, and OPD parameters required for the stereo upmixing through the parameter extractor 431 and store the extracted parameters in the memory 435. If the handover is generated and thus the stereo call is converted into the mono call, the processor 430 may convert the mono signal into the frequency region using the ILD, IPD, IC, and OPD parameters stored in the memory 435 and then generate the virtual stereo signal for stereo synthesis using the parameters. Next, if the left and right channel signals generated as the original time base are output through the first inverse converter 1421 and the second inverse converter 1422, the user of the electronic device 400 may perform the call through the stereo signal even after the handover is generated.

According to various embodiments of the present disclosure, the computation equations of the foregoing Equations 1 to 5 may be stored in the memory 435 for use by the processor 430. Further, the first converters 1311 and 1411 and the second converters 1312 and 1412 may convert the audio signal into the frequency region by various methods such as FFT, modified discrete cosine transform (MDCT), quadrature mirror filterback (QMF), and critical band (ERB, Narkband, Octave band). FIGS. 13A and 13B illustrate converting the audio signal into the frequency region by the first converters 1311 and 1411 and the second converters 1312 and 1412, but a converter that converts the audio signal into the time base may also be used.

Figure 14:
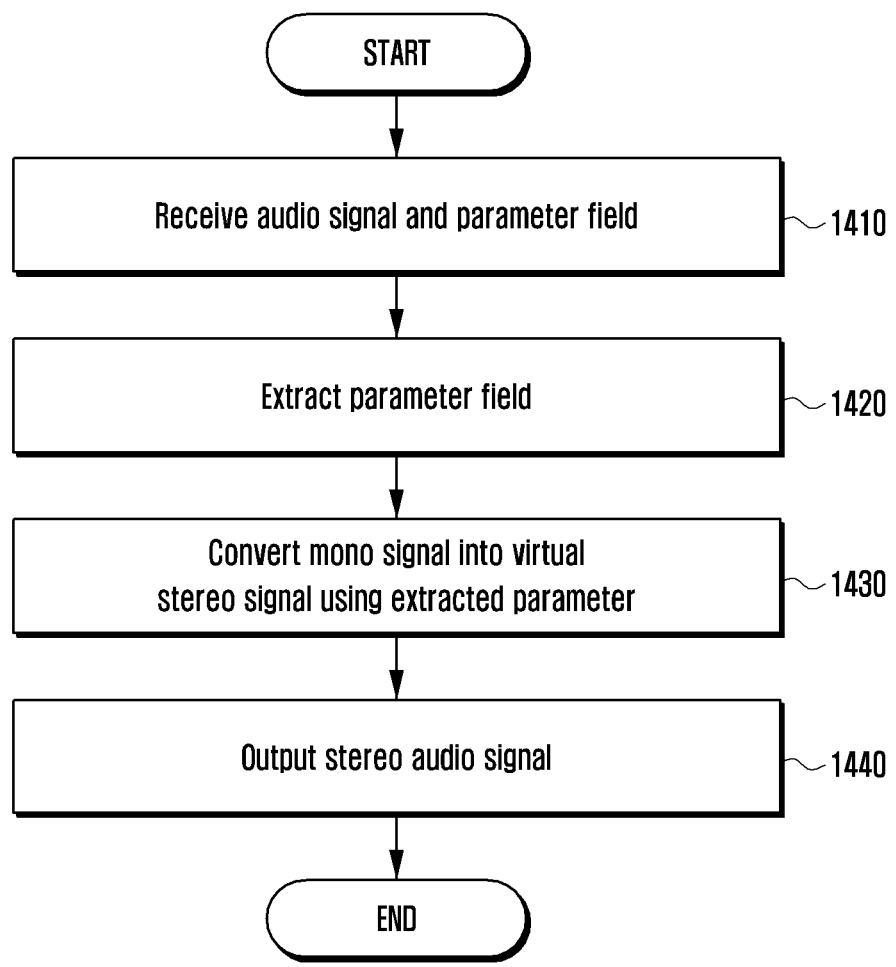
FIG. 14 is a flowchart illustrating a method for upmixing a mono signal to a stereo at a transmitting end of an electronic device according to an embodiment of the present disclosure.

FIG. 14 is a flowchart illustrating a method for upmixing a mono signal to a stereo at a transmitting end of an electronic device according to an embodiment of the present disclosure.

Referring to FIG. 14, in operation 1410, the wireless communication unit 410 of the electronic device 400 may receive the audio signal and the IPD, ILD, IC, and OPD parameter fields from the wireless communication unit (transmitter) of the external electronic device. The parameter fields transmitted from the transmitter of the external electronic device may be a parameter of analyzing the audio signal received through a multi microphone and may be a target sound source designated by the user or a target sound source designated by beamforming tracking at the time of the mono call.

In operation 1420, the processor 430 of the electronic device 400 may use the parameter extractor 431 to extract the IPD, ILD, IC, and OPD parameters from the received audio signal.

In operation 1430, if the handover is generated and thus the stereo signal is converted into the mono signal, the processor 430 of the electronic device 400 may use the extracted parameters to convert the mono signal into the virtual stereo signal.

In operation 1440, the output unit 450 of the electronic device 400 may output the converted virtual stereo signal.

Therefore, according to various embodiments of the present disclosure as illustrated in FIG. 14, the stereo parameters may be extracted from the signal received along with the audio signal from the external electronic device, the mono signal may be converted into the virtual stereo signal using the extracted parameters, and may be output.

Figure 15:
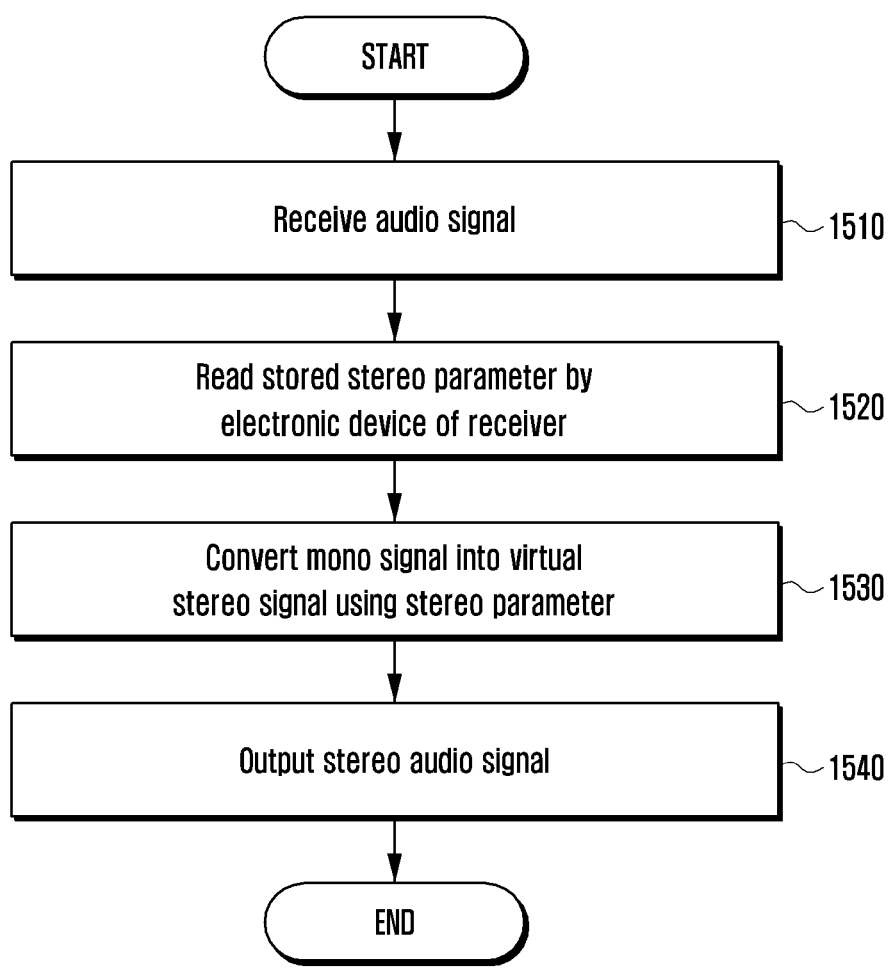
FIG. 15 is a flowchart illustrating a method for upmixing a mono signal to a stereo at a receiving end of an electronic device according to an embodiment of the present disclosure.

FIG. 15 is a flowchart illustrating a method for upmixing a mono signal to a stereo at a receiving end of an electronic device according to an embodiment of the present disclosure.

Referring to FIG. 15, in operation 1510, the wireless communication unit 410 of the electronic device 400 may receive a mono audio signal from an external electronic device.

In operation 1520, the processor 430 of the electronic device 400 may read the stereo parameters stored in the memory 435. The processor 430 may extract the IPD, ILD, IC, and OPD stereo parameters by left (L) channel and right (R) channel from the previous stereo signal and store the extracted stereo parameters in the memory 435.

In operation 1530, the processor 430 of the electronic device 400 may upmix the stereo parameter signals read from the memory 435 using the upmixer 433 to convert the converted mono signal into the stereo signal.

In operation 1540, the output unit 450 of the electronic device 400 may output the converted virtual stereo signal.

According to embodiments of the present invention, it is possible to provide an optimal sound service to a user of an electronic device by converting a mono signal into a stereo signal even if a stereo call is converted into a mono call due to a change in an environment like a handover.

According to various embodiments of the present disclosure, it is possible to provide an optimal stereo call service by upmixing a mono signal to a stereo signal even if a stereo call is converted into a mono call due to the environment change like a handover while the electronic device performs the stereo call with an external electronic device.

According to various embodiments of the present disclosure, it is possible to provide an optimal sound quality and impression of space by performing a virtual communication function even at the time of a mono call.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
 a communication circuit configured to communicate an audio signal transmitted from an external electronic device by a network supporting a first type and a second type, the first type being a stereo call type and the second type being a mono call type; and
 at least one processor configured to:
  receive the audio signal through the network in a stereo type using the communication circuit,
  confirm condition information associated with the network,
  generate other audio signals corresponding to the first type using an audio signal converted from the first type into the second type from the network based on the condition information corresponding to a set condition, the set condition corresponding to a handover being generated while the communication circuit communicates the audio signals corresponding to the first type, and
  output the other audio signals through a speaker functionally connected to the electronic device.

2. The electronic device of claim 1, further comprising:
a memory,
wherein the at least one processor is further configured to store parameters associated with the first type in the memory based on at least an operation of receiving the audio signal by the first type.

3. The electronic device of claim 2, wherein the at least one processor is further configured to generate the other audio signals based on at least one parameter.

4. The electronic device of claim 1, wherein the at least one processor is further configured to generate the other audio signals using parameters associated with the first type that are received from the network and the audio signal changed to the second type, when the condition information belongs to the set condition.

5. The electronic device of claim 1, wherein the at least one processor is further configured to:
confirm whether another network supports the first type based on the condition information when a connection between the electronic device and the external electronic device is changed from one network to the other network, and
generate the other audio signals when the network does not support the first type.

6. The electronic device of claim 1, wherein the audio signal is transmitted while the electronic device communicates with an external electronic device.

7. The electronic device of claim 1, wherein the first type is a stereo type and the second type is a mono type.

8. The electronic device of claim 1, wherein the condition information associated with the network includes at least one of a change from a first network supporting a stereo type to a second network that does not support the stereo type, a change in a communication state of the network of received sensitivity and throughput, or a change in network of a handover.

9. The electronic device of claim 1, wherein the other audio signals include a virtual stereo audio signal.

10. The electronic device of claim 2, wherein the parameters associated with the first type are at least one of a parameter generated while the electronic device performs stereo call with the external electronic device, a parameter generated at a handover timing of the network, a parameter corresponding to a stereo signal from the network at the time of a handover, a parameter set in a server, or a parameter stored in a memory.

11. The electronic device of claim 2, wherein the parameters associated with the first type are parameters associated with the stereo type and a plurality of parameters for supporting a plurality of different modes that are generated before the parameters are generated.

12. A method for converting a call type of an electronic device, the method comprising:
receiving a stereo signal from an external electronic device through a wireless communicator;
extracting parameters from the stereo signal received by at least one processor of the electronic device;
based on a handover being detected while the electronic device communicates with the external electronic device through the stereo signal, converting the received stereo signal into a mono signal;
upmixing, by the at least one processor of the electronic device, the extracted parameters to convert the converted mono signal into the stereo signal; and
outputting the stereo signal.

13. The method of claim 12, further comprising using a characteristic relationship between two received channel signals to extract parameters required for stereo upmixing, comprising:
an interchannel phase difference (IPD),
an interchannel level difference (ILD),
an interchannel coherence (IC), and
an overall phase difference (OPD).

14. The method of claim 12, further comprising storing, by the at least one processor, the parameters extracted from the received stereo signal in a memory.

15. The method of claim 12, further comprising using stereo parameters stored in a memory to convert the mono signal into the stereo signal when a handover from a network that supports a stereo call to a network that does not support the stereo call is generated.

16. The method of claim 12, further comprising:
confirming whether the electronic device continues to be in a mono call network region after a predetermined time elapses at the time of the generation of the handover; and
continuously maintaining a mono call to improve a computation of the electronic device if the electronic device continues to be in the mono call network region.

17. The method of claim 12, further comprising, when the electronic device receives the mono signal from the external electronic device through the wireless communicator:
receiving a request signal to convert the mono signal into the stereo signal; and
reading stereo parameters stored in a memory to convert the mono signal into the stereo signal and output the stereo signal, according to the request signal.

18. The method of claim 12, further comprising, when the electronic device receives an audio signal and a parameter field from the external electronic device through the wireless communicator:
using a parameter extractor to extract the parameter field; and
using the extracted parameter field to convert the mono signal into a virtual stereo signal and output the virtual stereo signal if the handover is generated while the electronic device communicates with the external electronic device.

19. The method of claim 12, further comprising, when the electronic device receives the mono signal from the external electronic device through the wireless communicator:
reading stereo parameters stored in a memory; and
upmixing stereo parameters read from the memory to convert the mono signal into the stereo signal and output the stereo signal.

20. A non-volatile recording medium having stored thereon a program to configure at least on processor to perform a method of an electronic device comprising, when the electronic device uses a communication circuit to receive an audio signal through a network by a stereo type:
confirming condition information associated with the network,
generating other audio signals corresponding to the stereo type using an audio signal converted from the stereo type into a mono type from the network when the condition information belongs to a set condition, the set condition corresponding to a handover being generated while the communication circuit communicates the audio signals corresponding to the first type, and outputting the other audio signals through a speaker functionally connected to the electronic device.

* * * * *